United States Patent
Wright

(10) Patent No.: US 6,801,816 B2
(45) Date of Patent: Oct. 5, 2004

(54) CUSTOMER CONTROLLED MANUFACTURING PROCESS AND USER INTERFACE

(75) Inventor: John Wright, Hackensack, NJ (US)

(73) Assignee: International Flavors & Fragrances Inc., New York, NY (US)

( * ) Notice: Subject to any disclaimer, the term of this patent is extended or adjusted under 35 U.S.C. 154(b) by 611 days.

(21) Appl. No.: 09/795,601

(22) Filed: Feb. 28, 2001

(65) Prior Publication Data

US 2002/0026322 A1 Feb. 28, 2002

Related U.S. Application Data

(60) Provisional application No. 60/240,896, filed on Oct. 17, 2000, and provisional application No. 60/185,532, filed on Feb. 28, 2000.

(51) Int. Cl.[7] .............................................. G06F 19/00
(52) U.S. Cl. ...................................................... 700/95
(58) Field of Search ............................. 700/90, 95, 97, 700/101, 103, 106, 107, 116, 117, 99; 705/16, 26–29, 51, 57, 59; 717/1, 5; 707/9

(56) References Cited

U.S. PATENT DOCUMENTS

| | | | |
|---|---|---|---|
| 4,598,376 A | 7/1986 | Burton et al. | |
| 4,797,818 A | 1/1989 | Cotter | |
| 5,570,292 A | 10/1996 | Abraham et al. | |
| 6,684,389 B1 * | 1/2004 | Tanaka et al. | 717/140 |
| 2002/0004749 A1 * | 1/2002 | Froseth et al. | 705/16 |

FOREIGN PATENT DOCUMENTS

WO      WO 98/52144      11/1998

* cited by examiner

*Primary Examiner*—Albert W. Paladini
*Assistant Examiner*—Chad Rapp
(74) *Attorney, Agent, or Firm*—Joseph F. Leightner

(57) ABSTRACT

A method for customer manufacturing control of a process containing trade secret formulations, comprises the following steps: associating tag descriptors to a corresponding trade secret; formulating a product as a function a selected number and quantity of the tag descriptors; transmitting the tag formulation to a manufacturing system; and decoding said tag formulation into a corresponding trade secret formulation; wherein the corresponding trade secret formulation is not accessible by the customer.

18 Claims, 3 Drawing Sheets

CUSTOMER CONTROLLED MANUFACTURING PROCESS AND USER INTERFACE

CROSS REFERENCES TO RELATED APPLICATIONS

This application claims the benefit of U.S. Provisional application Ser. No. 60/185,532, filed on Feb. 28, 2000 and U.S. Provisional application Ser. No. 60/240,896, filed on Oct. 17, 2000.

FIELD OF THE INVENTION

This invention related to the filed of manufacturing, and more particularly to manufacturing of a product based on a formula.

BACKGROUND OF THE INVENTION

In manufacturing food and cosmetics fragrances, flavors and colors are important to consumer perception of the product. The formulation of fragrances, flavors and colors is more of an art than an analytical science, with results being highly subjective. Traditionally, highly skilled artisans who learn and develop trade secrets over a number of years have handled the blending of fragrances, flavors and colors. Large businesses can employ the highly skilled artisans and experiment with different flavors, fragrances and colors, providing a marketing edge over their competitors. Medium and small manufacturers have had to rely on standardized formulations, partner with a large manufacturer, make significant expenditures, or rely on a flavor kit which contains a profile flavor and additional flavors to make changes with (fine tune). There is a need for fragrances, flavors and colors to be able to be formulated in small quantities without the necessity of a highly skilled artisan.

SUMMARY OF THE INVENTION

The present invention is a method and system for customer control of a manufacturing process. The method, comprises the following steps: associating tag descriptors to a corresponding trade secret; formulating a product as a function of a selected number and quantity of the tag descriptors; transmitting the tag formulation to a manufacturing system; and decoding said tag formulation into a corresponding trade secret formulation; wherein the corresponding trade secret formulation is not accessible by the customer.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Figure 1:
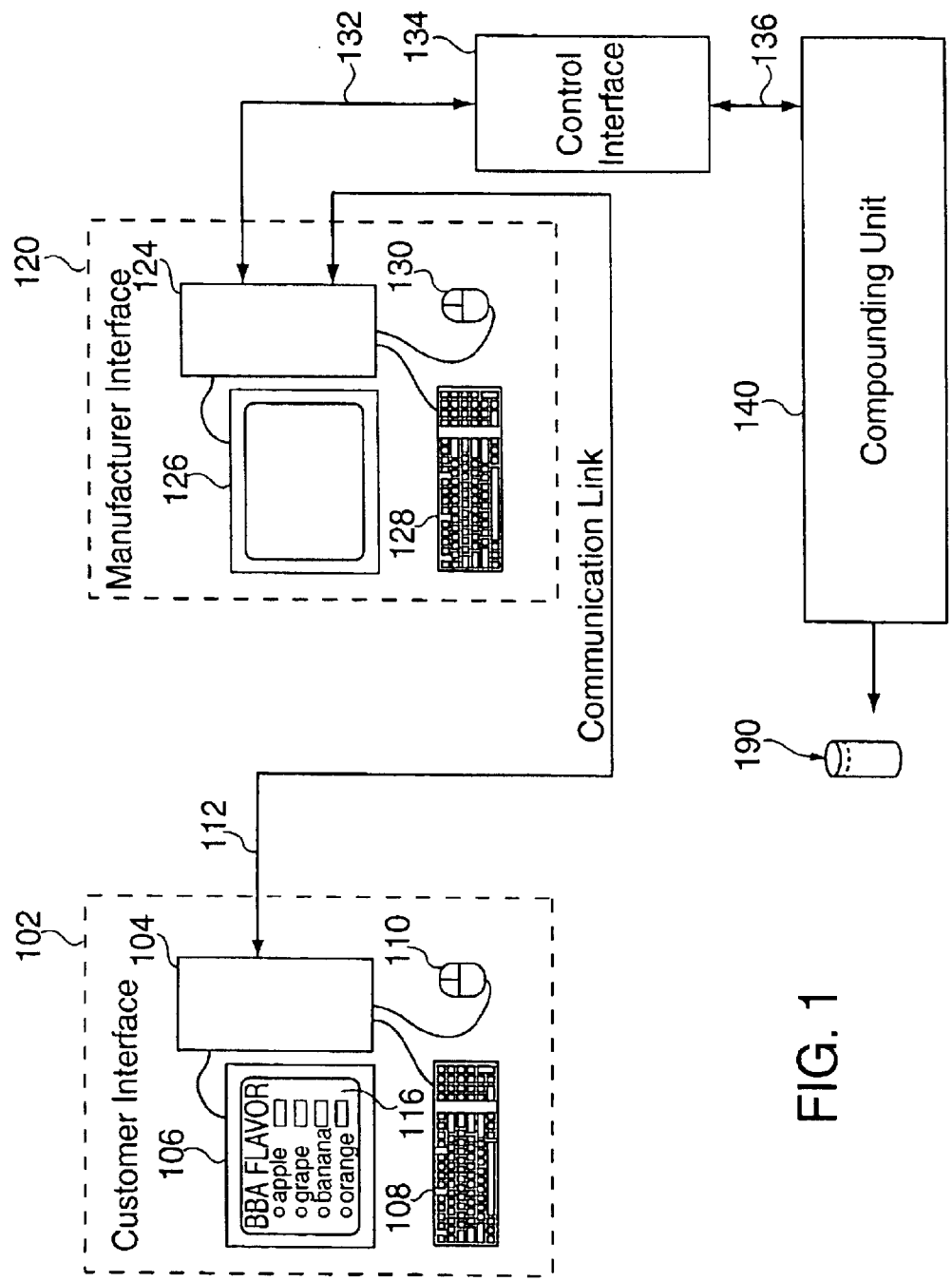
FIG. 1 is a functional overview a system employing the present invention, customer controlled manufacturing process.

Although the present invention, a method and system for customer control of a manufacturing process, is particularly well suited for use is flavor manufacturing and shall be so described, the present invention is equally well suited for use with other manufacturing processes dependent on formulations such as fragrances, colors, dyes, animal feed mixes, etc. Fragrances have been handled in exactly the same way as flavors, with only minor modifications to the descriptors.

The flavor of food results from the stimulation of the chemical senses of taste and smell by specific food molecules. Taste reception is carried out in specialized cells located in the taste buds. The four basic taste sensations—sweet, salty, bitter, and sour—are detected in separate regions of the tongue, mouth, and throat because the taste cells in each region are specific for certain flavor molecules (e.g., sweeteners; see below).

In addition to the four basic tastes, the flavoring molecules in food stimulate specific olfactory (smell) cells in the nasal cavity. These cells can detect more than 10,000 different stimuli, thus fine-tuning the flavor sensation of a food.

A flavor additive is a single chemical or blend of chemicals of natural or synthetic origin that provides all or part of the flavor impact of a particular food. These chemicals are added in order to replace flavor lost in processing and to develop new products. Flavorings are the largest group of food additives, with more than 2000 compounds available for commercial use. Natural flavorings are derived or extracted from plants, spices, herbs, animals, or microbial fermentations. Artificial flavorings are mixtures of synthetic compounds that may be chemically identical to natural flavorings. Artificial flavorings are often used in food products because of the high cost, lack of availability, or insufficient potency of natural flavorings.

Flavorings are prepared from essential oils, such as bitter almond and lemon; from vanilla; from fresh fruits by expression; from ginger by extraction; from mixtures of essential oils and synthetic organic chemicals; or entirely from synthetic chemicals, with alcohol, glycerol, and propylene glycol, alone or in combination, as solvents. Water is added and sometimes food color as well. Extracts, essences, and flavors employing only natural flavoring agents are called natural or natural with the named flavors; those employing synthetics (in part or entirely) are called imitation, or artificial, flavorings.

The current procedure for developing flavors to satisfy a customer's specific needs is slow and involves several steps where miscommunications often result in a less than perfect end product. The formulation of fragrances, flavors and colors is more of an art than an analytical science, with results being highly subjective. Traditionally, highly skilled artisans who learn and develop trade secrets over a number of years have handled the blending of fragrances, flavors and colors. Large businesses can employ the highly skilled artisans and experiment with different flavors, fragrances and colors, providing a marketing edge over their competitors.

Typically a customer will communicate with the flavor manufacturer about their new project. A sales staff member of the flavor manufacturer will typically enter the customer's inquiry. The customer's project will be discussed by the flavor manufacturer at the next project meeting and then assigned or allocated to a flavorist. The flavorist will then select an existing flavor, modify an existing flavor or create an entirely new flavor, depending on their interpretation of the customer's needs. A sample is then prepared and sent to the customer for evaluation and testing. Typical sample size needed for testing is only ¼ to ½ an ounce while a 4-ounce sample is adequate for conducting a small production run. This process of interpretation, formulation and evaluation/testing will typically go through several iterations before a successful conclusion or until the customer simply runs out of time. Difficulties in communication between the customer and the flavor manufacturer typically stem from different interpretations of descriptive terms by the customer, flavor manufacturer sales staff and technical staff, including the flavorist.

One feature of the present invention, customer control of a manufacturing process, enables a customer to remotely select and formulate flavors, through a communication link (direct or through a network, such as the Internet) and then modify the selected flavor formulations immediately using everyday flavor profile descriptors. The modified flavors would be compounded by flavor manufacturer using an automatic compounding unit situated at either a flavor manufacturer's location or on the customer's premises.

Referring to FIG. 1, there is shown an overview a system employing the present invention, customer controlled manufacturing process. A customer first selects the closest flavor from a repertoire of flavors 116, partially shown on the display 106, by using a customer interface 102. Selections of flavor will be made on the basis of price, flavor type (for example strawberry), end use (for example candy), physical form (for example water-soluble liquid), regulatory requirements (for example FEMA GRAS) and simple profile descriptors (for example fresh). In some cases this selection will be ideal, but in most cases some modifications to the profile will be required (or desired to distinguish a product). The customer will be able to select profile descriptors at one of two levels of detail. At broad level general descriptors will be available (for example green). At a more detailed level a much wider range of descriptors will be available (for example green, bell pepper). All the descriptors use common English terms and do not require any specialized knowledge. If necessary, examples of each descriptor are available to assist the customer. The customer will be able, via the customer interface 102, to modify the level of any of the descriptors within set limits. The limits have been determined by extensive trials to minimize the possibility of seriously unbalancing the resultant flavor.

The customer interface 102 can be a computer system such as personal computer, lap top computer, personal digital assistant or other digital device having a suitable communication link. The customer interface 102, when implemented with a personal computer will typically comprise a display 106 keyboard 108, mouse 110 and processor system 104 having a compatible communication link. The processor system 104 will load and run a customer interface agent. The customer interface 102 can also contain printers, bar code readers, scanners, magnetic stripe scanners, touch screen interfaces and numerous other devices.

The customer information collected by the customer interface agent at the customer interface 102 is then sent, by a communication link 112 (directly or via the Internet), to the manufacturing interface 120. The manufacturing interface 120 has a manufacturer interface agent which will calculate the changes to the formulation of the flavor using trade secret information, not accessible by the customer interface 102, which allocates descriptor profiles to ingredients using the knowledge of a flavor expert. The manufacturer interface agent at manufacturer interface 120 will ensure that the modifications are within set limits, adjust for interactions between ingredients and adjust to comply with regulatory and safety requirements.

The manufacturer interface 120 can be computer system, such as mini computer, personal computer, dedicated manufacturing computer, or other digital device having suitable communication links. The manufacturer interface 120, when implemented with a personal computer will typically comprise a display 106, keyboard 108, mouse 110, and processor system 104 having a compatible communication link. The processor system 104 will load and run a customer interface unit.

The manufacturer interface 120 will then transmit by secured link 132 the formulation to a control interface 134. The control interface 134 is coupled through link 136 to the compounding machine 140. While a Fricke Laboratory Dosing Machine, such as one extended to 500 ingredients is well suited for use in system, other compounding machines having similar capabilities, such as machines manufactured by Roxane, as well as machines capable of compounding less ingredients, are also equally well suited. In one representative embodiment, all ingredients used by the compounding machine 140 are in liquid form. In some cases this will involve using solutions of powder ingredients.

Figure 2:
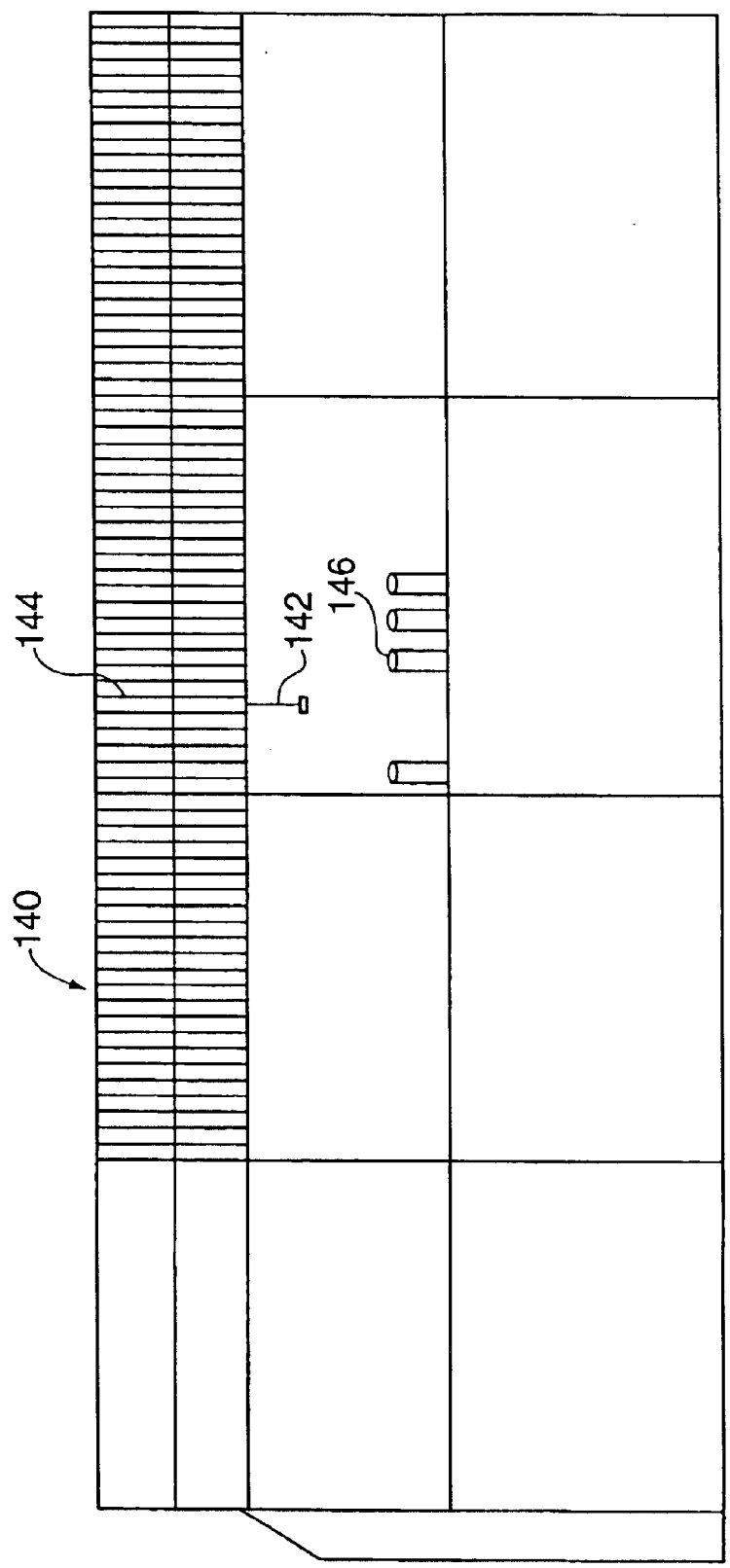
FIG. 2 is a detailed stylized drawing of the compounding machine, which was shown in FIG. 1; and, FIG. 3 is an exemplary embodiment of the user interface for controlling the formulation.

Referring to FIG. 2 there is shown a detailed stylized drawing of the compounding machine 140, which was shown in FIG. 1. The compounding machine 140 uses control valves 142 to dispense from 50 mg to 2.6 kg of any number of ingredients 144 into a mixing container 146. The compounding machine 140 can prepare the sample as soon as the formulation is received from the control interface 134 (shown in FIG. 1). After automated regulatory and safety checks, the sample will be available for immediate dispatch to the customer (or use by the customer if the compounding machine is at their location). While the Batch Management System, which interfaces with a Fricke Laboratory Dosing Machine, is particularly well suited for use with the present invention, other software interfaces are equally well suited and can be implemented by those skilled in the art.

Figure 3:
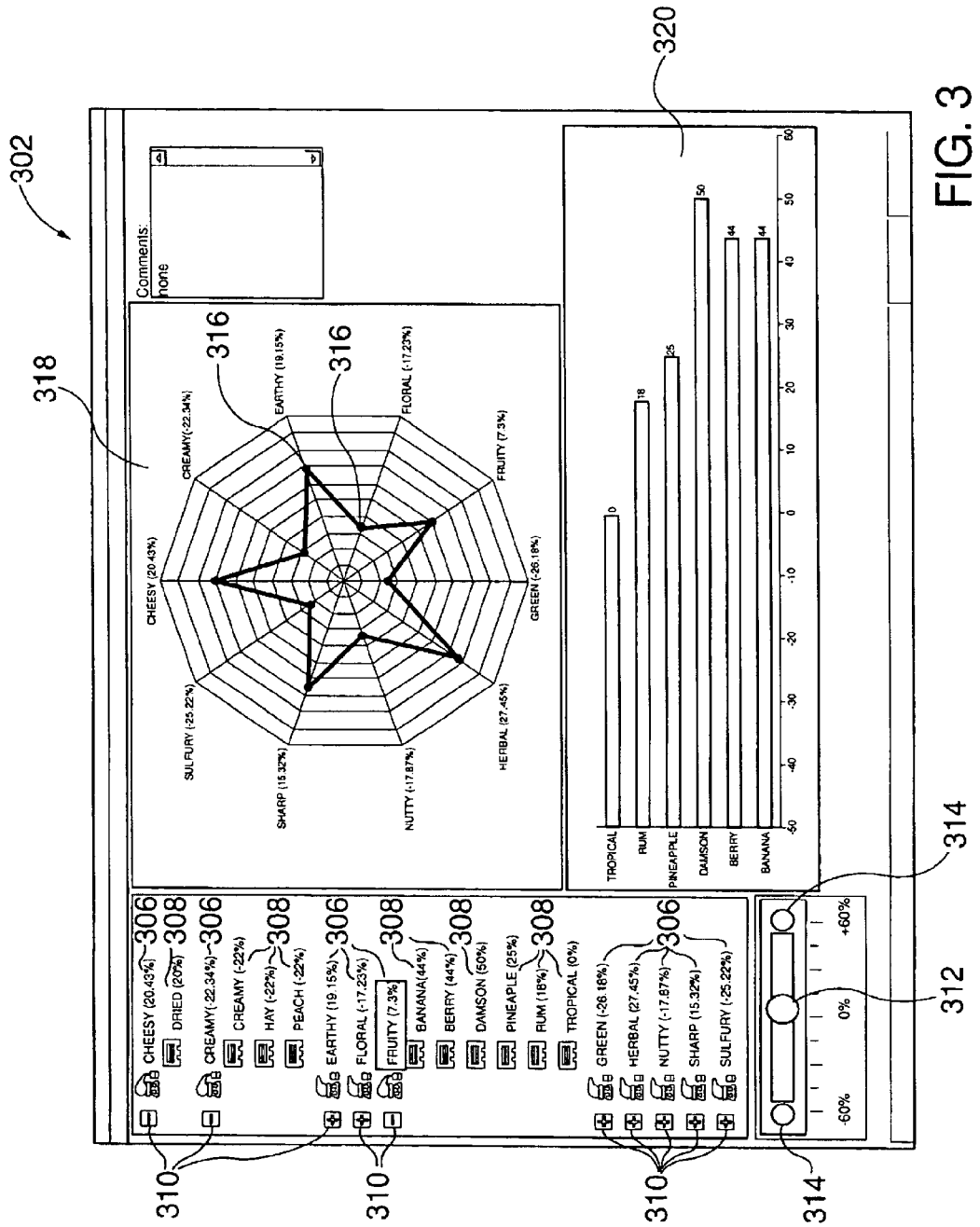

Referring to FIG. 3 there is shown an exemplary embodiment of the user interface for controlling the formulation. Shown on the user interface screen 302 is a formulation list 304 utilizing primary tag terms 306 including CHEESY, CREAMY, EARTHY, FLORAL, FRUITY, GREEN, HERBAL, NUTTY, SHARP and SULFURY. The primary tag terms 306 may be expanded into secondary tag terms 308 by clicking on the level detail control icon 310. A particular primary tag term 306 such as CHEESY may only expand into one particular secondary tag term 308 such as DRIED or a particular primary tag term 306 such as FRUITY may expand into a plurality of secondary tag terms 308 such as BANANA, BERRY, DAMSON, PINEAPPLE, RUM and TROPICAL. The amount of adjustment of primary tag term 306 as well as a secondary tag term 308 is optionally limited in order to preserve the formulation (not ruin the flavor). The limit of adjustment is essentially a stop that is set for each particular primary tag term 306 and secondary tag term 308. Not all tag terms may have stops, as the limits are dependent upon flavor and other considerations. Additionally, the stops may be dynamic in their setting, wherein adjustment of one or more primary or secondary tag terms may affect the values for the stops for another tag term. In this exemplary embodiment the user moves the slide button 312 within the predetermined stop ranges, increasing or decreasing the particular contribution of the selected component. Alternatively, the user can use the arrow buttons 314, enter in a value, drag the indicator 316 on the graph 318, or utilize any of a variety of user interfaces.

The graphical representation of the formulation 318 shows visually the primary tag term 306 composition by individual node points 316. This graph is supplemented by a bar graph 320, which corresponds to the secondary tag term 308 of the selected primary tag term 306. The graphical representation of the formulation 318 enables the customer to easily see the relative quantities of the selected items. Optionally a range may be overlaid on the graphical representation of the formulation 318 which will provide a rapid visual prompting of the adjustments that can be made to a particular formulation. The range may be further limited to a subset of 'preferred range' within 'absolute range' for a given selected tag term.

By placing the formulation of a flavor based on recognizable tag descriptors in the control of a customer, the customer can experiment with a great variety of flavor samples without being given access to the under lying trade secret formulation. The graphical representation of the formulation 318 enables the customer to have immediate visual feedback and receive prompting on the range of adjustments that can be made. Thus, expanding the manufacturer's market while providing highly personalized and rapid customer service. Essentially, the customer interface agent and the manufacturer interface agent provide the customer with a virtual flavorist without providing access to the underlying trade secrets possess by a flavorist.

When the customer has suitably adjusted the components in the formulation, they may save the formulation and order a sample of the formulation for testing. In one embodiment of the present invention, the information represented by the adjusted primary and secondary tag terms is transmitted to a manufacturing facility, which prepares a sample or other quantity. This may be by the Internet or other suitable computer or communication network. An overnight courier then dispatches the formulated sample quantity to the customer for testing and evaluation. After testing the customer can recall or reload a particular formulation and make additional changes or order larger quantities.

In view of the foregoing description, numerous modifications and alternative embodiments of the invention will be apparent to those skilled in the art. The customer interface agent may be a thin agent with minimal functionality or may be enhanced to provide developmental resources and assistance to the customer, including use of an intelligent agent to suggest flavor tag descriptors which when used in combination with the primary flavor will provide a suggested flavor or hint associated with a secondary tag (tart, bitter, sweeter, salty, etc.) as well as other suggestions. The customer interface client may contain prior formulations and information associated with testing or the formulations. Accordingly, this description is to be construed as illustrative only and is for the purpose of teaching those skilled in the art the best mode of carrying out the invention. Details of the structure may be varied substantially-without departing from the spirit of the invention, and the exclusive use of all modifications, which come within the scope of the appended claim, is reserved.

I claim:

1. A method for customer control of a manufacturing process containing trade secret fragrance formulations, the method comprising the following steps:
   associating tag descriptors to a corresponding trade secret;
   formulating a fragrance product as a function of a selected number and quantity of tag descriptors, said quantity having a predefined range;
   transmitting said tag formulation to a manufacturing system; and
   decoding said tag formulation into a corresponding trade secret fragrance formulation;
   wherein said corresponding trade secret fragrance formulations are not accessible by the customer.

2. The method as recited in claim 1 further comprising the step of displaying a graphical representation of said tag formulation.

3. The method as recited in claim 1 comprising the additional step of manufacturing said fragrance product utilizing said corresponding trade secret fragrance formulation.

4. The method as recited in claim 1 wherein said predefined range of said quantity for a particular tag descriptor is a function of other selected tag descriptors and their quantity.

5. The method as recited in claim 1 wherein the step of transmitting said tag formulation to a manufacturing system utilized a global communication network.

6. The method as recited in claim 1 wherein the step of formulating further comprises accessing prior formulations for subsequent modification.

7. System for customer control of a manufacturing process containing trade secret fragrance formulations, the system comprises:
   a customer interface for formulating a product as a function of a selected number and quantity of tag descriptors, said quantity having a predefined range and tag descriptors corresponding to a trade secret fragrance formulation;
   a communications interface for transmitting said tag formulation to a manufacturing system;
   a control interface for decoding said tag formulation into a corresponding trade secret fragrance formulation;
   wherein said corresponding trade secret fragrance formulations are not accessible by the customer.

8. The system as recited in claim 7 wherein said customer interface further comprises a graphical representation of said tag formulation.

9. The system as recited in claim 7 further comprising a compounding machine for manufacturing said product utilizing said corresponding trade secret fragrance formulation.

10. The system as recited in claim 7 wherein said quantity for a particular tag descriptor is a function of other selected tag descriptors and their quantity.

11. The system as recited in claim 7 wherein said communications interface utilizes a global communication network.

12. The system as recited in claim 7 wherein said customer interface accesses prior formulations for subsequent modification.

13. A customer controlled manufacturing device utilizing trade secret fragrance formulations, the device comprises:
   a customer interface for formulating a product as a function of a selected number and quantity of tag descriptors, said quantity having a predefined range and said tag descriptors corresponding to a trade secret fragrance formulation;
   a communications interface for transmitting said tag formulation from said customer interface to a manufacturing system;
   a control interface for decoding said tag formulation into a corresponding trade secret fragrance formulation; and,
   a compounding machine for manufacturing said product utilizing said corresponding trade secret fragrance formulation;
   wherein said corresponding trade secret fragrance formulations are not accessible by the customer.

14. The system as recited in claim 13 wherein said customer interface further comprises a graphical representation of said tag formulation.

15. The system as recited in claim 13 further comprising a compounding machine for manufacturing said product utilizing said corresponding trade secret fragrance formulation.

16. The system as recited in claim 13 wherein said quantity for a particular tag descriptor is a function of other selected tag descriptors and their quantity.

17. The system as recited in claim 13 wherein said communications interface utilizes a global communication network.

18. The device as recited in claim 13 wherein said customer interface accesses prior formulation for subsequent modification.

* * * * *